(12) United States Patent
Kushner

(10) Patent No.: US 7,447,799 B2
(45) Date of Patent: Nov. 4, 2008

(54) SYSTEM AND METHOD FOR AUTOMATICALLY UPDATING A WIRELESS DEVICE

(75) Inventor: Gary Kushner, San Francisco, CA (US)

(73) Assignee: Good Technology, Inc., Santa Clara, CA (US)

( * ) Notice: Subject to any disclaimer, the term of this patent is extended or adjusted under 35 U.S.C. 154(b) by 962 days.

(21) Appl. No.: 10/133,817

(22) Filed: Apr. 24, 2002

(65) Prior Publication Data

US 2003/0204624 A1 Oct. 30, 2003

(51) Int. Cl.
*G06F 15/173* (2006.01)
*G06F 12/00* (2006.01)

(52) U.S. Cl. .................... 709/242; 709/248
(58) Field of Classification Search ......... 709/200–203, 709/217–219, 248, 249, 250, 227; 707/201, 707/10; 717/169
See application file for complete search history.

(56) References Cited

U.S. PATENT DOCUMENTS

| | | | |
|---|---|---|---|
| 4,682,150 A | 7/1987 | Mathes et al. | |
| 5,049,881 A | 9/1991 | Gibson et al. | |
| 5,115,392 A | 5/1992 | Takamoto et al. | |
| 5,126,739 A | 6/1992 | Whiting et al. | |
| 5,159,592 A | 10/1992 | Perkins | |
| 5,321,840 A | 6/1994 | Ahlin et al. | |
| 5,469,161 A | 11/1995 | Bezek | |
| 5,521,597 A | 5/1996 | Dimitri | |
| 5,553,281 A | 9/1996 | Brown et al. | |
| 5,559,800 A | 9/1996 | Mousseau et al. | |
| 5,563,595 A | 10/1996 | Strohacker | |
| 5,666,530 A | 9/1997 | Clark et al. | |
| 5,715,387 A | 2/1998 | Barnstijn et al. | |
| 5,727,159 A | 3/1998 | Kikinis | |
| 5,727,202 A * | 3/1998 | Kucala | 707/10 |
| 5,760,716 A | 6/1998 | Mathews et al. | |
| 5,771,010 A | 6/1998 | Masenas | |
| 5,790,974 A | 8/1998 | Tognazzini | |
| 5,793,970 A | 8/1998 | Fakes et al. | |
| 5,802,312 A | 9/1998 | Lazaridis et al. | |

(Continued)

FOREIGN PATENT DOCUMENTS

EP 0666651 8/1995

(Continued)

OTHER PUBLICATIONS

EP Search Report, PCT/US0312799, mailed Sep. 15, 2005.

(Continued)

*Primary Examiner*—Zarni Maung
(74) *Attorney, Agent, or Firm*—Blakely Sokoloff Taylor & Zafman, LLP

(57) ABSTRACT

A system and method for automatically updating a wireless device. It is determined whether one or more changes have occurred to a set of files. The set of files includes one or more files. Information related to the one or more changes is received and automatically forwarded to a wireless. The information is utilized to automatically update one or more files on the wireless device to reflect the one or more changes in the set of files. For example, file can be added to the directory, removed from the directory, modified, etc.

28 Claims, 8 Drawing Sheets

U.S. PATENT DOCUMENTS

| | | | |
|---|---|---|---|
| 5,841,376 A | 11/1998 | Hayashi | |
| 5,870,610 A | 2/1999 | Beyda | |
| 5,875,329 A | 2/1999 | Shan | |
| 5,903,230 A | 5/1999 | Masenas | |
| 5,930,471 A | 7/1999 | Milewski et al. | |
| 5,961,590 A | 10/1999 | Mendez et al. | |
| 5,974,238 A | 10/1999 | Chase, Jr. | |
| 5,987,464 A | 11/1999 | Schneider | |
| 6,003,089 A | 12/1999 | Shaffer et al. | |
| 6,023,708 A | 2/2000 | Mendez et al. | |
| 6,034,621 A * | 3/2000 | Kaufman | 340/7.21 |
| 6,052,735 A | 4/2000 | Ulrich et al. | |
| 6,065,017 A * | 5/2000 | Barker | 707/202 |
| 6,104,392 A | 8/2000 | Shaw et al. | |
| 6,111,707 A * | 8/2000 | Buddecke et al. | 360/15 |
| 6,151,606 A | 11/2000 | Mendez | |
| 6,216,157 B1 | 4/2001 | Vishwanath et al. | |
| 6,218,970 B1 | 4/2001 | Jaquette | |
| 6,219,694 B1 | 4/2001 | Lazaridis et al. | |
| 6,226,618 B1 | 5/2001 | Downs | |
| 6,259,891 B1 | 7/2001 | Allen | |
| 6,275,848 B1 | 8/2001 | Arnold | |
| 6,279,001 B1 | 8/2001 | DeBettencourt et al. | |
| 6,304,881 B1 | 10/2001 | Halim et al. | |
| 6,310,889 B1 | 10/2001 | Parsons et al. | |
| 6,330,618 B1 | 12/2001 | Hawkins et al. | |
| 6,343,299 B1 | 1/2002 | Huang et al. | |
| 6,347,340 B1 | 2/2002 | Coelho et al. | |
| 6,360,272 B1 | 3/2002 | Lincke et al. | |
| 6,874,037 B1 | 3/2002 | Abram et al. | |
| 6,384,850 B1 | 5/2002 | McNally et al. | |
| 6,393,434 B1 | 5/2002 | Huang et al. | |
| 6,396,482 B1 | 5/2002 | Griffin et al. | |
| 6,401,136 B1 | 6/2002 | Britton et al. | |
| 6,430,601 B1 | 8/2002 | Eldridge et al. | |
| 6,449,622 B1 | 9/2002 | LaRue et al. | |
| 6,457,062 B1 | 9/2002 | Pivowar et al. | |
| 6,460,055 B1 * | 10/2002 | Midgley et al. | 707/204 |
| 6,463,463 B1 | 10/2002 | Godrey et al. | |
| 6,463,464 B1 | 10/2002 | Lazaridis et al. | |
| 6,477,543 B1 | 11/2002 | Huang et al. | |
| 6,505,055 B1 | 1/2003 | Kahn et al. | |
| 6,535,892 B1 | 3/2003 | LaRue et al. | |
| 6,571,245 B2 | 5/2003 | Huang et al. | |
| 6,604,236 B1 * | 8/2003 | Draper et al. | 717/170 |
| 6,615,253 B1 | 9/2003 | Bowman-Amuah | |
| 6,625,621 B2 | 9/2003 | Tan et al. | |
| 6,636,873 B1 * | 10/2003 | Merchant et al. | 707/201 |
| 6,640,244 B1 | 10/2003 | Bowman-Amuah | |
| 6,654,746 B1 | 11/2003 | Wong et al. | |
| 6,658,167 B1 | 12/2003 | Lee et al. | |
| 6,671,757 B1 | 12/2003 | Multer et al. | |
| 6,694,335 B1 | 2/2004 | Hopmann et al. | |
| 6,697,458 B1 | 2/2004 | Kunjibettu | |
| 6,701,378 B1 | 3/2004 | Gilhuly et al. | |
| 6,721,019 B2 | 4/2004 | Kono et al. | |
| 6,721,787 B1 | 4/2004 | Hiscock | |
| 6,721,871 B2 | 4/2004 | Piispanen et al. | |
| 6,757,698 B2 | 6/2004 | McBride et al. | |
| 6,792,085 B1 | 9/2004 | Rigaldies et al. | |
| 6,901,415 B2 | 5/2005 | Thomas et al. | |
| 6,907,243 B1 | 6/2005 | Patel | |
| 6,931,454 B2 * | 8/2005 | Deshpande et al. | 709/248 |
| 6,934,766 B1 | 8/2005 | Russell | |
| 6,941,348 B2 | 9/2005 | Petry et al. | |
| 6,941,349 B2 | 9/2005 | Godfrey et al. | |
| 6,954,789 B2 | 10/2005 | Dietz et al. | |
| 6,973,299 B2 | 12/2005 | Apfel | |
| 6,983,308 B1 | 1/2006 | Oberhaus | |
| 7,003,776 B2 * | 2/2006 | Sutherland | 719/315 |
| 7,085,809 B2 | 8/2006 | Mori et al. | |
| 7,092,699 B1 | 8/2006 | Hefter | |
| 7,136,934 B2 | 11/2006 | Carter et al. | |
| 7,139,555 B2 | 11/2006 | Apfel | |
| 7,149,813 B2 | 12/2006 | Flanagin et al. | |
| 7,155,483 B1 | 12/2006 | Friend et al. | |
| 2001/0004744 A1 | 6/2001 | Lazaridis et al. | |
| 2001/0005864 A1 | 6/2001 | Mousseau et al. | |
| 2001/0010059 A1 | 7/2001 | Burman et al. | |
| 2001/0034654 A1 | 10/2001 | Vigil et al. | |
| 2001/0054115 A1 | 12/2001 | Ferguson et al. | |
| 2002/0013853 A1 | 1/2002 | Baber et al. | |
| 2002/0019225 A1 | 2/2002 | Miyashita | |
| 2002/0032722 A1 | 3/2002 | Baynes et al. | |
| 2002/0046286 A1 | 4/2002 | Caldwell et al. | |
| 2002/0119793 A1 | 8/2002 | Hronek et al. | |
| 2002/0120696 A1 * | 8/2002 | Mousseau et al. | 709/206 |
| 2002/0146240 A1 | 10/2002 | Ogawa et al. | |
| 2002/0160773 A1 | 10/2002 | Gresham et al. | |
| 2003/0046434 A1 | 3/2003 | Flanagin et al. | |
| 2003/0050046 A1 | 3/2003 | Conneely et al. | |
| 2003/0069842 A1 | 4/2003 | Kight et al. | |
| 2003/0081621 A1 | 5/2003 | Godfrey | |
| 2003/0097381 A1 | 5/2003 | Detweiler et al. | |
| 2004/0054739 A1 | 3/2004 | Friend et al. | |
| 2004/0105423 A1 | 6/2004 | Koehler et al. | |
| 2004/0109436 A1 | 6/2004 | Vargas et al. | |
| 2005/0148356 A1 | 7/2005 | Ferguson et al. | |

FOREIGN PATENT DOCUMENTS

| | | |
|---|---|---|
| EP | 0909037 | 4/1999 |
| EP | 0917077 | 5/1999 |
| EP | 1014629 | 6/2000 |
| WO | WO 00/67158 A | 11/2000 |
| WO | WO 02/19626 A | 3/2002 |

OTHER PUBLICATIONS

PCT International Search Report, PCT/US03/12799.

Hild, et al., "Mobilizing Applications", *IEEE Personal Communications*, XP-000721303, (Oct. 1997), 26-34.

* cited by examiner

SYSTEM AND METHOD FOR AUTOMATICALLY UPDATING A WIRELESS DEVICE

CROSS-REFERENCES TO RELATED APPLICATIONS

Not applicable.

BACKGROUND OF THE INVENTION

1. Field of the Invention

The present invention relates generally to the field of wireless communication, and more particularly to a system and method for updating a wireless device.

2. Background of the Invention

A variety of businesses have embraced wireless solutions. Enterprise workforces are increasingly mobile and accordingly require access to time-critical data while away from the office. Further, increased globalization and competition requires companies to be more accessible and responsible. Using wireless-enabled "smart devices," mobile workers can make more efficient use of their out-of-office time, thus producing cost savings. Similarly, real-time responsiveness to customer requests may differentiate one enterprise from a competitor, resulting in greater revenue via increased customer sales. Wireless technology provides flexibility with respect to time and place of work to workers in today's market.

Due to the numerous advantages outlined above, wireless technology has been rapidly adopted by enterprises. Increasingly, wireless devices can provide mobile professionals access to the corporate resources and applications that are already available to them on desktops. However, handheld device and network limitations can make those applications and resources difficult to access and use. Further, mobile professionals, and the companies for which they work, constantly add to and modify data on their fixed computing devices. Solutions involving synching require manual updating via a desktop cradle or wireless modem, relying on user intervention. Persistently synching devices at a workstation in order to receive updates to critical data is time consuming and not cost effective.

Thus, a system and method are needed for updating a wireless device in a time-efficient manner, with little or no user intervention required.

SUMMARY OF THE INVENTION

The present invention provides in various embodiments a system and method for updating a wireless device.

In a system and method according to one embodiment of the present invention, a set of files is provided, the set of files including one or more files associated with a user; a server is configured to determine whether one or more changes have occurred to the set of files and configured to automatically forward information related to the one or more changes to a wireless device of the user.

In a method according to another embodiment of the present invention, it is determined whether one or more changes have occurred to a set of files, the set of files including one or more files; information related to the one or more changes is received; the information is forwarded (automatically, in one embodiment) to a wireless device; and one or more files on the wireless device are updated to reflect the one or more changes in the set of files utilizing the information.

A further understanding of the nature and advantages of the inventions herein may be realized by reference to the remaining portions of the specification and the attached drawings.

DESCRIPTION OF THE SPECIFIC EMBODIMENTS

Figure 1:
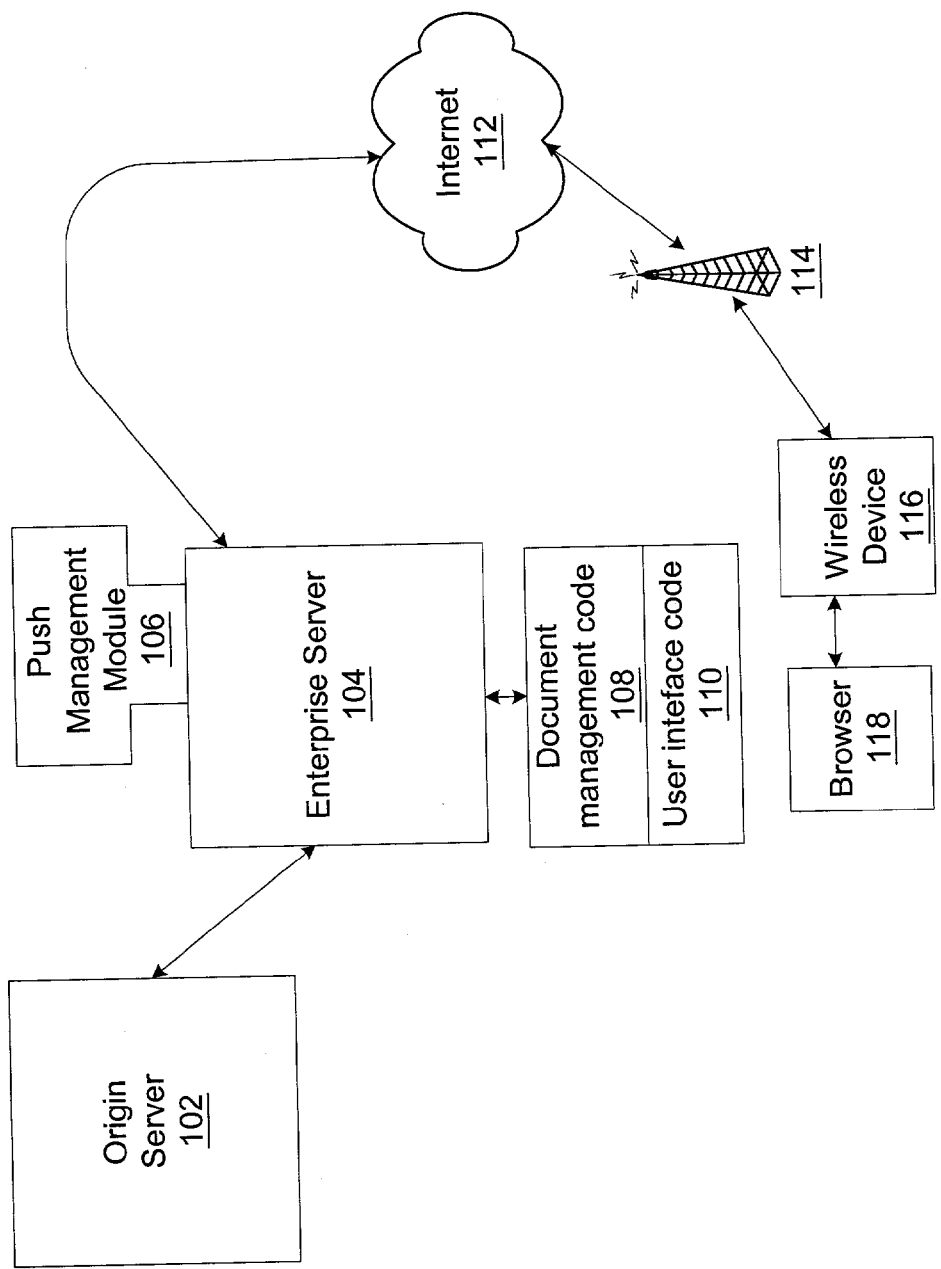
FIG. 1 is a schematic drawing of an exemplary architecture, in accordance with an embodiment of the present invention.

As shown in the exemplary drawings wherein like reference numerals indicate like or corresponding elements among the figures, an embodiment of a system according to the present invention will now be described in detail. The following description sets forth an example of a system and method for updating a wireless device.

Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Wireless devices are widely used in today's world. Accordingly, there is a need for a variety of wireless solutions. The present system solves the problem of constantly synching one's wireless device with their fixed computing device by automatically forwarding information related to a change(s), such as an addition, a deletion, or any other modification to folders, subfolders, files etc., at the fixed computing device. Accordingly, a user can expect his or her wireless device to automatically be updated utilizing the system and method of the present invention.

One way the present system fulfills current needs is by adding push support to enterprise applications. Information related to updates is automatically pushed to users' wireless devices. Accordingly, workers are provided with up-to-date information without having to incessantly seek out such information. The present invention eliminates the need for manual synching, and assures that information is sent and received transparently.

Referring now to the drawings, FIG. 1 is a schematic drawing of an exemplary architecture in accordance with an embodiment of the present invention. In the example, origin server 102 is coupled to enterprise server 104 to allow for the exchange(s) of data between the two servers. Enterprise server 104 is coupled to push management module (PMM) 106, document management code module 108, and user interface code module 110. Data from enterprise server 104 may be forwarded to wireless device 116 via transmission medium 114 by way of a wide area network, such as Internet 112, as shown. Wireless device 116 includes browser 118. A wireless device may include any wireless device that communicates via a wireless network, such as a Palm Pilot™, a "smart phone," a RIM™ device, etc. In one embodiment, wireless device 116 may be a portable wireless device. It is also contemplated that in other embodiments, other devices that may or may not be wireless may be used in accordance with embodiments of the present invention.

Enterprise server 104 may be representative of a server computer in an enterprise environment. For example, a corporation may provide wireless services to its employees utilizing the present system, including enterprise server 104. In an exemplary embodiment of the present invention, enterprise server 104 resides behind a corporate firewall to ensure the secure transmission of data.

Origin server 102 may represent any source of information external to a company hosting enterprise server 104, or another server internal to the company hosting enterprise server 104, serving as a source of information. Although origin server 102 is not requisite, such a server is often coupled to a company's enterprise server to provide information.

Enterprise server 104 is coupled to origin server 102 in the example shown to facilitate data exchange(s). However, enterprise server 104 may be coupled to any type of source suitable for use with the present system. Further, enterprise server 104 may serve as the primary origin of data, in which case it may not be coupled to any type of source server at all.

PMM 106 may represent a plug-in application, an application program generally, or any other component of enterprise server 104 suitable for use with the present system. PMM 106 is software that attaches/plugs-in to enterprise server 104 to provide basic push capabilities. PMM 106 makes it possible for an application to send secure messages to wireless device 116 without waiting for a user to send a request. Accordingly, useful information can be sent to wireless device 116 of the user in advance of when the information is needed or requested. Thus, when the user needs the information, the information is already present. Accordingly, no time is lost in sending a request (such as a hyperttext transfer protocol (HTTP), etc. request) from wireless device 116 to enterprise server 104 and waiting for data to return to wireless device 116. Further, the data on wireless device 116 of the user is the most up-to-date information available.

Document management code module 108 may also be a plug-in application, an application program generally, firmware, or any other component associated with enterprise server 104 that is suitable for use with the present system. Document management code 108 communicates with PMM 106 in an exemplary embodiment according to the present invention.

PMM 106 may communicate the information to enterprise server 104 while providing an alert that information is being forwarded. Information can include documents, alerts or any other type of information suitable for use with the present system. For example, new files, deleted files, change(s) to files, directories, set of files, etc. Another such example is applications. The information may be forwarded to the server without any type of alert. In other words, the information can be sent transparently.

Further, the information may be sent as an alert to wireless device 116 so that when the information arrives at wireless device 116 of the user, the user is notified of its arrival, such as in the same way a user is notified of an electronic mail (E-mail) message. For example, if wireless device 116 is configured to beep three times for E-mail, it can do the same when information with an alert arrives. A notification may also be displayed on a screen of wireless device 116 when the information arrives. If no alert accompanies the information, the information can be saved as a message for viewing at a later time, but the user is not notified of the arrival of the information (document, etc.) in one embodiment.

In an exemplary embodiment according to the present invention, user interface code module 110 is an application on enterprise server 104. However, user interface code module 110 may be an application residing elsewhere provided it is coupled to enterprise server 104 via a network. For example, user interface code module 110 may reside on a user computer, a separate computer associated with the user, such as a computer of an information technology (IT) manager, etc. As will be discussed in further detail, the user can modify existing files, add files, etc. utilizing user interface code module 110.

Utilizing enterprise server 104, PMM 106 forwards information to wireless device 116 via Internet 112, or another suitable network, by way of wireless transmission medium 114. PMM 106 can check for network connectivity and will transmit the information to wireless device 116 by way of enterprise server 104 when a connection is secured.

An exemplary system and method utilizing the architecture described herein will now be discussed. In a system and method according to one embodiment of the present invention, it is determined whether one or more changes have occurred to a set of files. The set of files may include a file system and/or a directory structure. The set of files may reside on a server, a user computer, and/or a separate computer associated with the user (e.g., a computer of a manager of the user company, etc.). The one or more changes to the set of files may include adding a file to the set of files, deleting a file from the set of files, modifying a file in the set of files or the set of files itself, such as by renaming a file, etc. The set of files includes one or more files. Information related to the one or more changes is received and automatically forwarded to wireless device 116. In one embodiment, a unique identifier is assigned to the information related to the one or more changes. Further, the information associated with the one or more changes can be manipulated. One or more files on wireless device 116 are automatically updated to reflect the one or more changes in the set of files utilizing the information. One specific exemplary implementation of such functionality will be set forth during reference to FIG. 4. In one embodiment, a notification of the one or more changes is forwarded to wireless device 116.

In another embodiment, the set of files are periodically accessed in order to determine whether the one or more changes to the set of files has occurred. In another embodiment, it may be determined whether the one or more changes to the set of files is related to a predetermined group associated with the set of files (e.g., sales division, engineering department, etc.). The information associated with the one or more changes can then be conditionally forwarded to the wireless device based on the predetermined group (e.g., technical specifications are only forwarded to users that are part of the engineering department).

As discussed herein, the change(s) may include, inter alia, modifying the one or more files in the set of files, in which case the modified file can be re-pushed to wireless device 116 with the same unique identifier (such as a global unique identifier (GUID), etc.). The modified file may essentially overwrite the previously un-modified file. Thus, the modifications to the one or more files essentially creates a new file that replaces the one or more existing files.

Notification of the change(s), or any other type of change(s), may be forwarded to enterprise server 104. Further, notification of the change(s) and the update associated with the change(s) may be forwarded to the user via wireless device 116 associated with the user, or any other user interface, such as a computing device of the IT manager, etc. Enterprise server 104 and/or the user may register with the set of files to be notified of a change(s) to the set of files. In one embodiment, enterprise server 104 periodically accesses the set of files in order to determine whether a change(s) to the one or more files in the directory has occurred. In an alternative embodiment, enterprise server 104 is adapted for manipulating the information associated with the change(s), such as processing the information by changing it's configuration, adding headers to the information, or any other type of manipulation of the information that may be suitable. In another embodiment, one or more modules are associated with enterprise server 104 for manipulating the information.

As discussed herein, a unique identifier (e.g., GUID, etc.) may be assigned with the information associated with the change(s). Assignment of a unique identifier may be done for tracking purposes, for example. As noted, a new unique identifier may be associated with a new or existing file, or an existing unique identifier may continue to be associated with an existing file, even though the existing file may be modified and replaced by the modified file.

Figure 2:
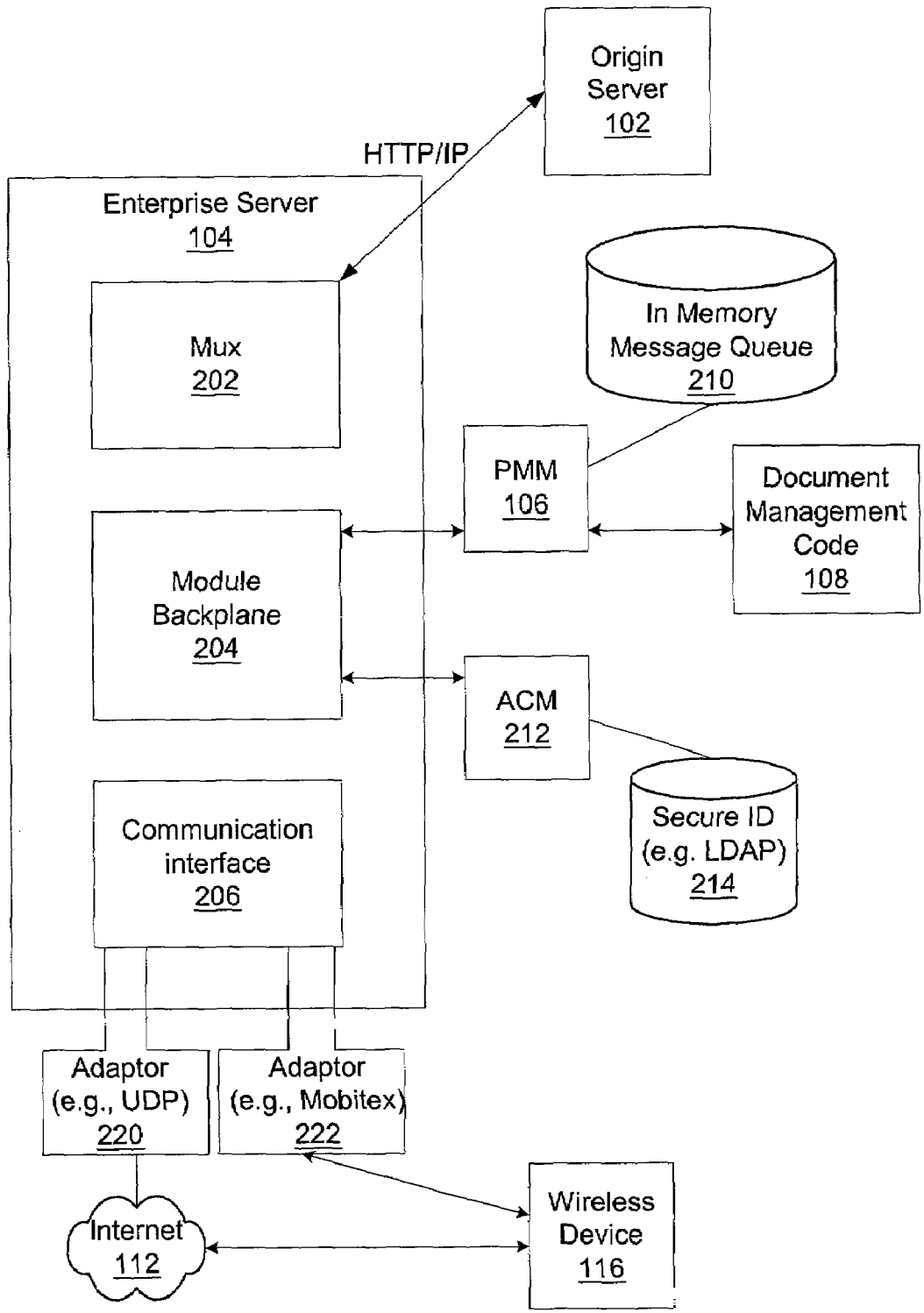
FIG. 2 is a schematic diagram illustrating the architecture of the enterprise server in relation to other elements that may be associated therewith, in accordance with an embodiment of the present invention.

In further keeping with some embodiments according to the present invention, FIG. 2 is a schematic diagram illustrating exemplary architecture of enterprise server 104 in relation to other elements that may be associated therewith. As previously discussed, enterprise server 104 may be connected to origin server 102, as well as PMM 106.

Enterprise server 104 may include multiplexer (MUX) module 202 for multiplexing data signals. Module platform 204 and communication interface module 206 may also be included as part of enterprise server 104. Module platform 204 may be connected to various additional modules. In FIG. 2, PMM 106 and Access Control Module (ACM) 212 are illustrated as examples of modules that may be connected to module backplane 204 of enterprise server 104. ACM 212 controls what areas of an application/web site are accessible by what users. The modules may include databases associated therewith, such as 210 and 214 indicated in FIG. 2. An example of Secure ID 214, may include Lightweight Directory Access Protocol (LDAP), for example. As discussed herein, PMM 106 may be responsible for notifying document management code module 108 of a change(s) to the set of files.

Communications interface module 206 may include adaptor 222 for communicating with wireless device 116. An example of such an adaptor is commonly known as "Mobitex." Communication to wireless device 116 may be accomplished utilizing another type of adaptor, such as user datagram protocol (UDP) 220 via the Internet 112, utilizing Internet protocol (IP), or by any other suitable means.

MUX module 202 may represent a hard-wired module with direct connectivity to some type of source, such as origin server 102 shown in FIG. 2. Information flows to and from MUX module 202 from communication interface 206 and may be manipulated by module backplane 204, which may include various modules, as discussed herein.

PMM 106 monitors communications via ports. Information may be pushed from document management code module 108 to wireless device 112 via PMM 106 and enterprise server 104. Conversely, wireless device 112 may provide information to user interface code module 110 via document management code module 218, which may receive the information from enterprise server 104 via PMM 106.

Document management code module 108 is capable of communicating with any PMM. For example, a PMM of a server other than enterprise server 104 may receive communications from document management code module 108.

In one embodiment, the set of files includes a file system that in turn includes one or more directory structures. The directory structures can be created either on enterprise server 104 directly, or via user interface code module 110. The directory structures may include a hierarchical structure, including folders, subfolders, etc. For example, a form library may be organized utilizing the directory structure(s). When a user adds to, deletes, or otherwise modifies files within the directory structure(s), the activity is communicated to document management code module 108. Document management code module 108 may utilize PMM 106 to provide an alert associated with information relating to the addition and/or modification, or the information may be transmitted transparently, without using an alert. PMM 106 forwards the information to enterprise server 104, which sends the updated information to a wireless device of the user, such as wireless device 116. Browser 118 on wireless device 116 monitors communications related to the information. Accordingly, one or more files on wireless device 116 are automatically updated with the information that has been pushed to wireless device 116 via enterprise server 104.

Figure 3:
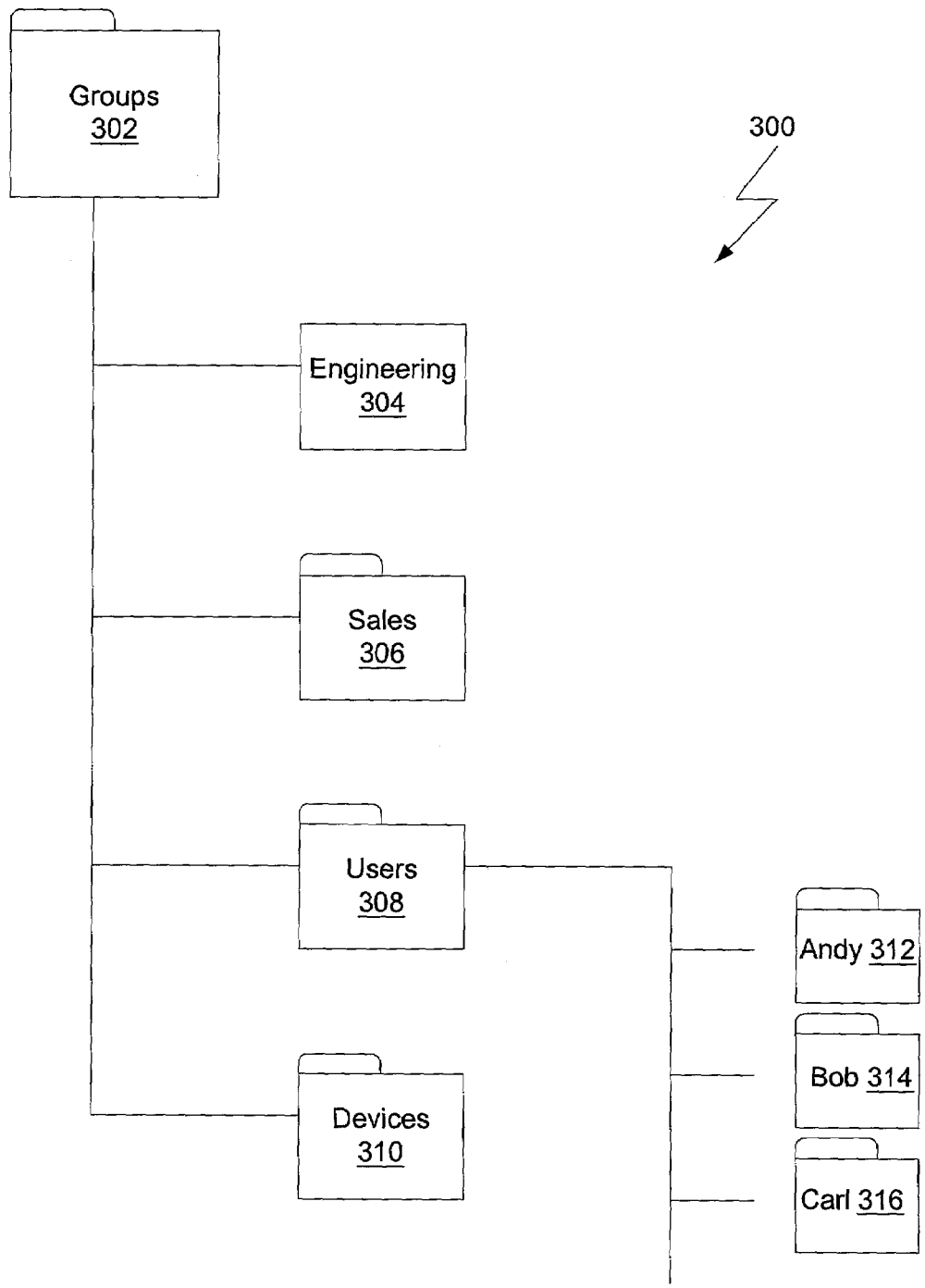
FIG. 3 is a schematic diagram of an exemplary directory structure, in accordance with an embodiment of the present invention.

Referring now to FIG. 3, an exemplary directory structure 300 is illustrated in accordance with an embodiment of the present invention. As indicated in FIG. 3, a Groups folder 302 may include various subfolders, such as engineering 304, sales 306, users 308 and devices 310. Groups folder 302 may include subfolders further including predetermined groups, for example, as discussed herein. FIG. 3 also illustrates that the subfolders 304, 306, 308 and 310 may include further subfolders. For example, the users folder 308 may include folders for Andy 312, Bob 314 and Carl 316. The folders may include user lists for forwarding updated information to users on the list. Various other folders and subfolders may be included. As another example, a subfolder labeled "All" may be included, the subfolder including files pertaining to all users. In a typical user interface environment, a user may drag and drop a file from one folder to the next, or from an outside source into a folder within directory structure 300. A user may also drag and drop folders and subfolders. When such a folder is moved or added, or a file within directory structure 300 is otherwise modified, the information is transmitted to one or more wireless devices, such as wireless device 116, associated with the user in order to update the one or more wireless devices.

Each folder has associated with it a set of wireless devices 116 that will receive updates. This association is stored in a configuration file or database. In one embodiment, as long as the association is maintained, changing the name of a directory does not need to change which wireless devices 116 are associated with which directory. Often, however, the interface code will maintain logical mapping between the folder names and which wireless devices 116 the folder is associated with. For example, the user name might be the same as the folder name. In that case, if the folder name changes then the folder would be associated with a different user name. This kind of mapping is not necessary, however.

As discussed herein, a set of files may include a file system and/or directory structure, such as directory structure 300. Generally, file systems and directory structures represent user interaction modes. Any mode of user interaction suitable for use with the present system may be employed. For example, a web interface, file transfer protocol (FTP) interface, a machine-to-machine interface, such as simple object access protocol (SOAP), etc., may also be utilized to enable user interaction.

Figure 4:
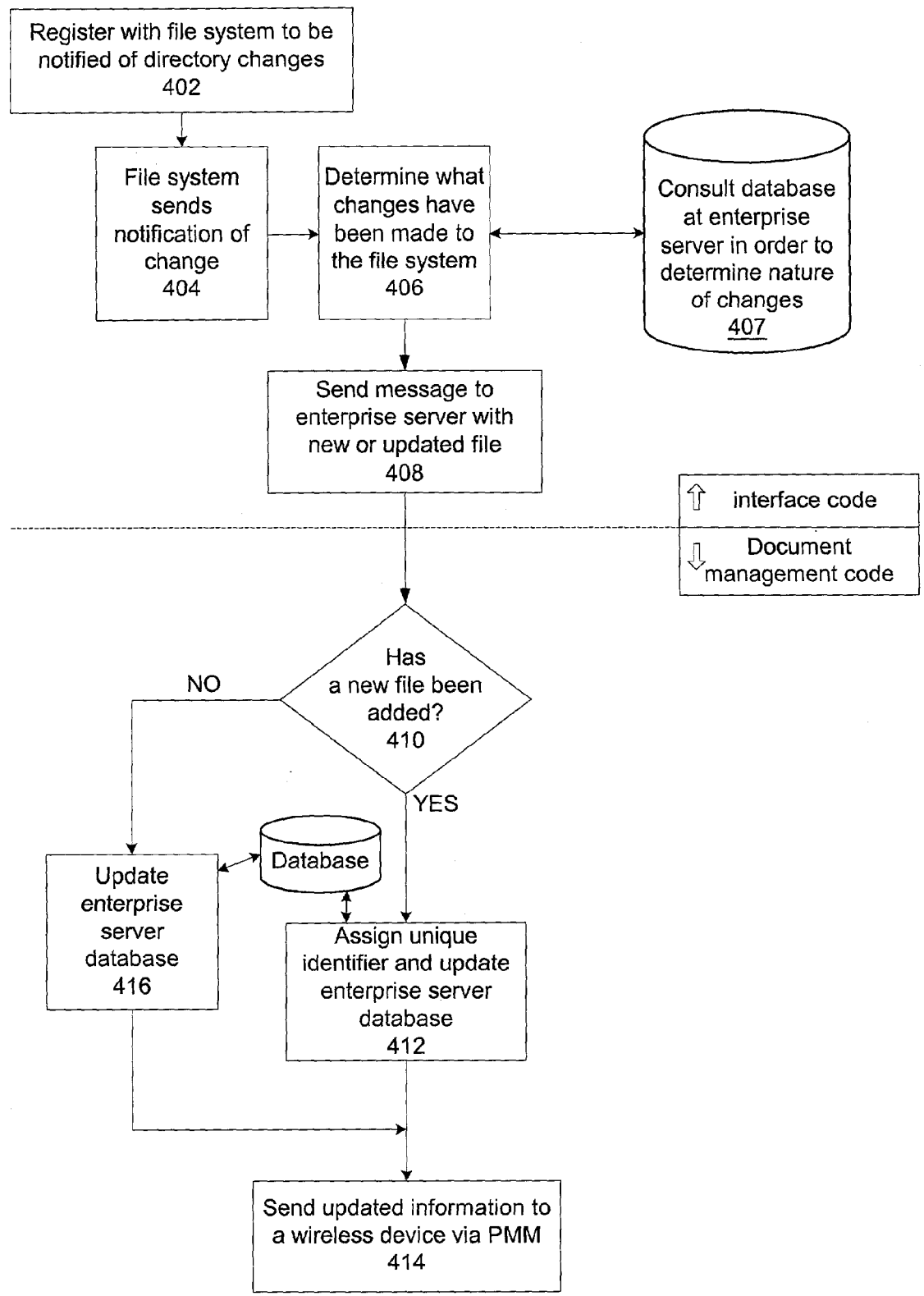
FIG. 4 is a flowchart illustrating a process for identifying change(s) to the file system, in accordance with an embodiment of the present invention.

In order to update wireless device 116 of the user, the nature of the change(s) to the set of files is determined. FIG. 4 illustrates how a change(s) to one or more files in directory structure 300 associated with a file system on enterprise server 104 are determined. In FIG. 4, the illustration exemplifies a set of files that includes a file system, the file system creating a directory structure, referred to simply as a directory in FIG. 4. A flowchart illustrating a process for identifying a change(s) to the one or more files in the directory in accordance with an embodiment of the present invention is shown.

At step 402, the user registers with the file system, via a user interface, such as user interface code module 110, to be notified of a change(s). At step 404, the file system sends notification of a change(s) to the one or more files in directory structure 300. At step 406, user interface code module 110 determines what change(s) has occurred to directory structure 300 by consulting database 407. At step 408, a message is sent to the server with the new or updated file information. At step 410, it is determined whether a new file was added. If a new file was added, a unique identifier is assigned and the database is updated therewith at step 412. The updated information is forwarded to the device via PMM 106, or any other suitable push mechanism, at step 414. If a new file was not added, the database is updated with the information associated with the change(s) at step 416 and the information is forwarded to wireless device 116 at step 414.

The process described above is a notification process. Thus, when a user makes a change(s) that affects directory structure 300, the file system notifies enterprise server 104 of the change(s). This alert indicates to enterprise server 104 that action can be taken in response to the change(s). In other words, enterprise server 104 can determine the nature of the change(s) that occurred and forward the change(s) to wireless device 116 of the user.

Figure 5:
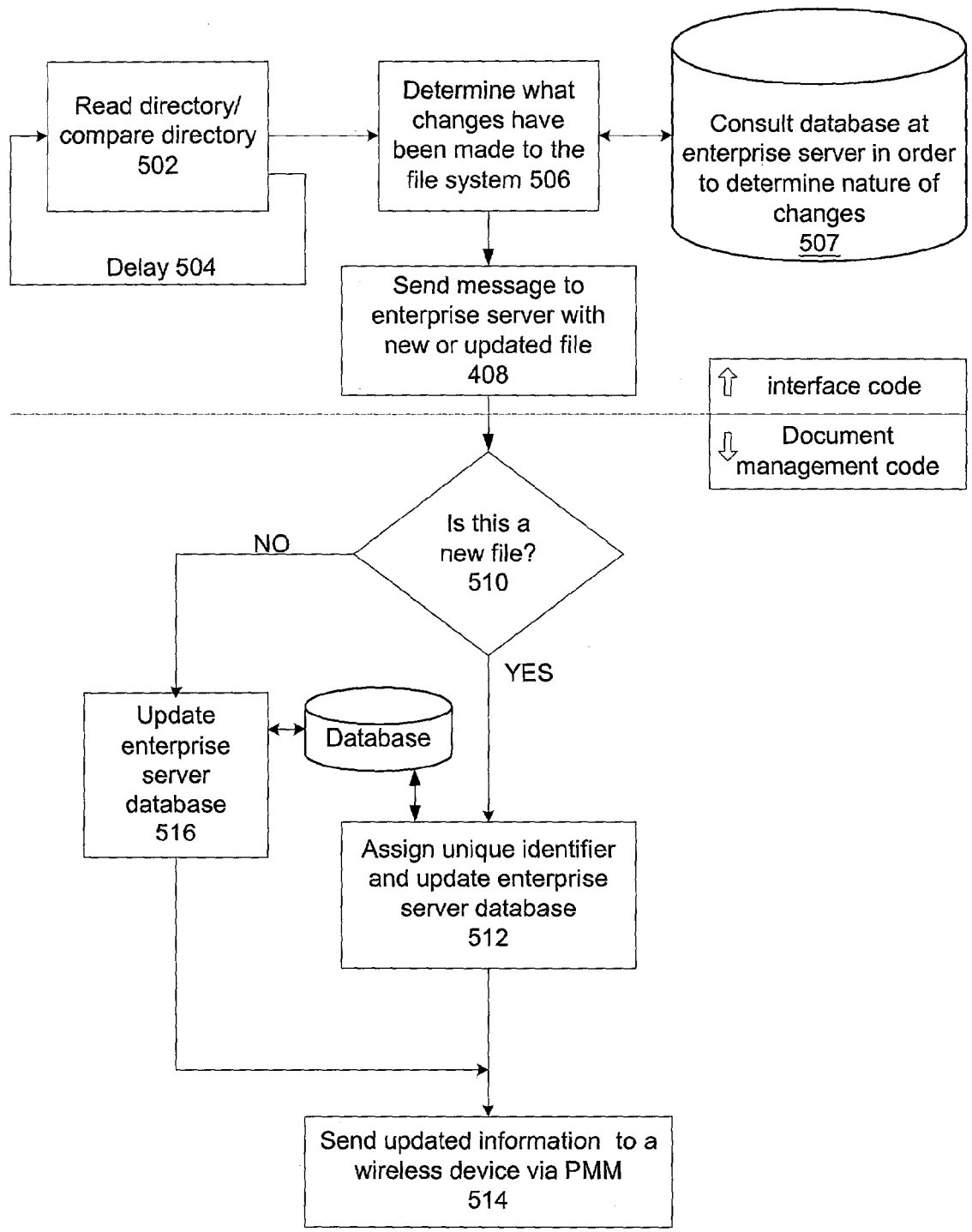
FIG. 5 is a flowchart illustrating an alternative process for monitoring file system change(s), in accordance with an embodiment of the present invention.

FIG. 5 is a flowchart illustrating an alternative process for monitoring a change(s) to a set of files in accordance with an embodiment of the present invention. At step 502, enterprise server 104 periodically reads directory structure 300 associated with the file system. A delay results at step 504, which may be scheduled. The delay may be shortened or lengthened to adjust the frequency with which the directory is accessed. At step 506, directory structure 300 is checked for a change(s) that may have occurred since the previous time directory structure 300 was read. Database 508 may be accessed to determine the nature of any change(s) that may have occurred. As in FIG. 4, it is determined whether a new file was added at step 510. If a new file was added, a unique identifier is assigned and the database is updated at step 512. The information associated with the new file is forwarded to wireless device 116 at step 414, via PMM 106, or any other suitable push mechanism. If the change(s) does not include the addition of a new file to the file system, the database is updated with the change(s) at step 516 and the information is sent to wireless device 116 at step 514.

As previously discussed herein, directory structure 300 may be created on enterprise server 104. However, directory structure 300 may also be created on a computer of the user, or a computer otherwise associated with the user, such as the computer of a manager employed by, affiliated with, etc., a user company, for instance. Where directory structure 300 is created on a user company computer and it resides on the user company computer, the file system will check directory structure 300 on the user computer company computer for a change(s) and the file system will notify enterprise server 104 of a change(s) to directory structure 300.

Figure 6:
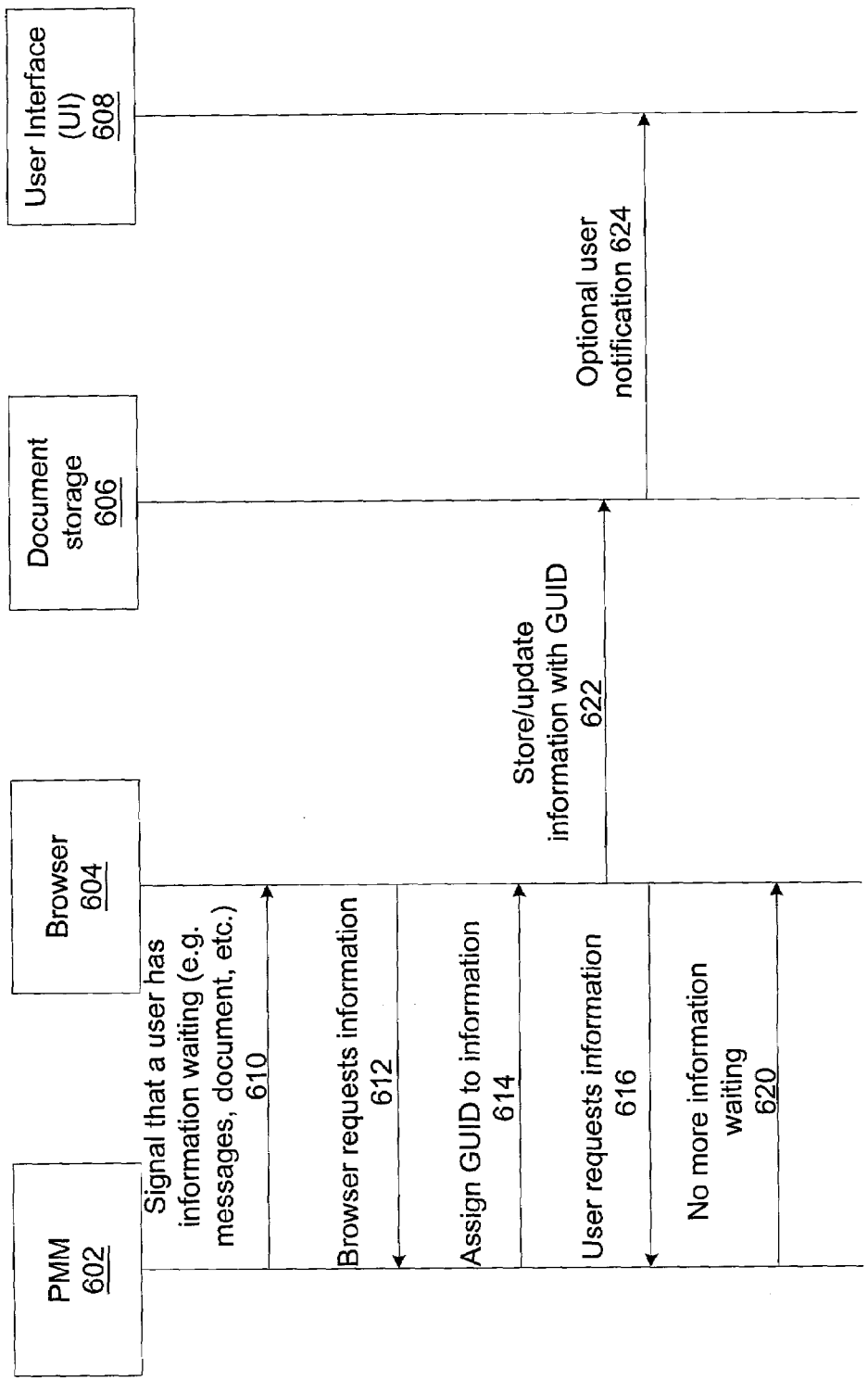
FIG. 6 is a schematic diagram illustrating a process for forwarding updated information to a wireless device, in accordance with an embodiment of the present invention.

FIG. 6 is a schematic diagram illustrating a process for forwarding updated information to wireless device 116 in accordance with an embodiment of the present invention. PMM 602, browser 604, document storage 606 and user interface 608 on wireless device 116 associated with the user, are in communication by way of one another. At step 610, when PMM 602 receives information from the server (e.g., enterprise server 104), PMM 602 passes a signal to browser 604 on wireless device 116 of the user, that the user has current messages. At step 612, browser 604 requests the information, as shown in FIG. 6. At step 614, the information with unique identifier is forwarded. As indicated in FIG. 6, the information may be a document, among other things. The information may include any type of new or modified data suitable for use with the present invention. At step 616, browser 604 sends an acknowledgment that the information was received and requests the next message and so on until no more information exists, as indicated at step 620. An error message may be sent by wireless device 116 of the user and/or PMM 602 if the message was not received or non-delivery was caused.

It should be noted that this is just one exemplary implementation. Other implementations are possible. For example, PMM 602 can send the messages directly instead of sending a signal and letting the client retrieve the messages.

At step 622, the information may be stored and/or updated with the assigned unique identifier in document storage area 606 on wireless device 116. Optionally, a notification may be forwarded to the user at step 624 via user interface 608 on wireless device 116 and/or a user interface on a fixed computing device. This notification may indicate that the information has been forwarded to wireless device 116 of the user. Such notification may alert the user that wireless device 116 of that user has been updated in accordance with new or modified information on the fixed computing device of the user.

As discussed herein, PMM 602 may receive the information and send a push notification to each wireless device 116 that is to receive the information. Transmission of the information can be secured by encrypting it and sending it to wireless device 116 using a technology such as transport layer security (TLS) or wireless transport layer security (WTLS).

If PMM 602 does not receive a request from wireless device 116 for the information (e.g. documents, messages) waiting, PMM 602 may resend the notification. The time intervals for resending a notification may be specified. Other conditions for resending the notification may also be specified. These conditions include resending the notification when wireless device 116 comes back into coverage, when wireless device 116 is turned back on, when a new message arrives at PMM 602, etc.

A new or additional wireless device 116 of the user may also be provisioned utilizing a system and method according to the present system. For example, the user may synchronize a new or additional wireless devices with a fixed computing device of the user. In this scenario, the server may recognize all of the files in the file system as new files and replicate them on wireless device 116 of the user. Accordingly, each file may be assigned a unique identifier and the database may be updated with the information and the unique identifier.

Figure 7:
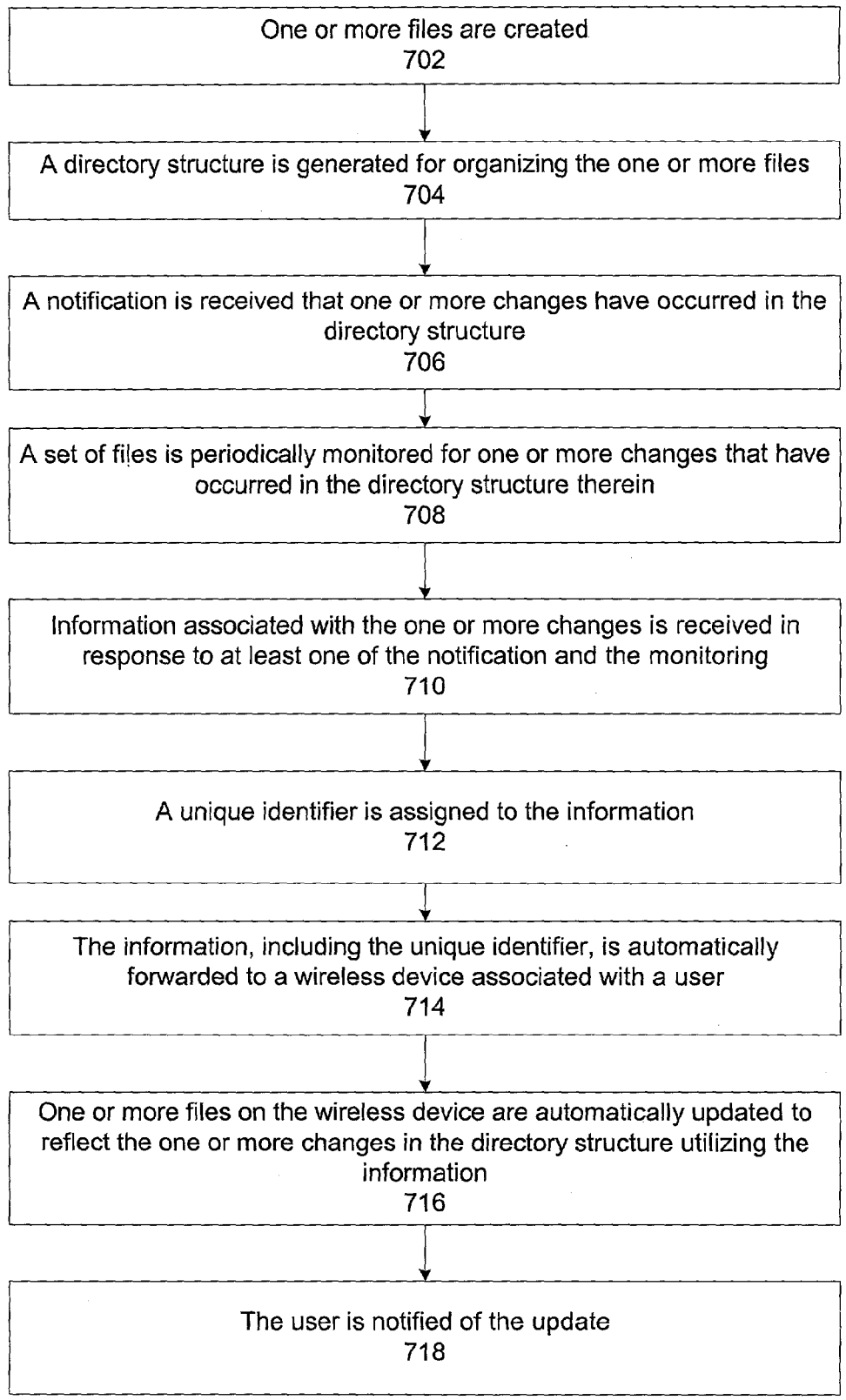
FIG. 7 is a flowchart illustrating a process for updating a wireless device, in accordance with an embodiment of the present invention.

FIG. 7 is a flowchart illustrating a process for updating wireless device 116 in accordance with an embodiment of the present invention. At step 702, one or more files are created. At step 704, a directory structure, such as directory structure 300, is generated for organizing the one or more files. At step 706, a notification is received that a change(s) has occurred in directory structure 300. At step 708, a set of files is periodically monitored for a change(s) that has occurred in directory structure 300 therein. At step 710, information associated with the change(s) is received in response to at least one of the notification and the monitoring. At step 712, a unique identifier is assigned to the information. At step 714, the information, including the unique identifier assigned thereto, is automatically forwarded to a wireless device associated with a user. At step 716, one or more files on wireless device 116 are automatically updated to reflect the change(s) to the directory utilizing the information. At step 718, the user is notified of the update.

As discussed herein, a change(s) may include a modification to an existing file in directory structure 300, the addition of a new file, etc. Where the change(s) includes a change(s) to an existing file in directory structure 300, the information forwarded may include information for replacing the previous file with a new file including the change(s) to the existing file. In other words, the change(s) may be used to overwrite the pre-existing file.

A notification of a change(s)s may be forwarded to the server to alert the server of change(s) to directory structure 300. Furthermore, a notification may be forwarded to a user associated with one or more wireless devices 116 that wireless device 116 has been updated. The notification may be forwarded to the user via wireless device 116 of the user and/or the fixed computing device of the user. Enterprise server 104 may periodically access the file system in order to determine whether change(s) to directory structure 300 have been made. In this scenario, notification may not be forwarded to enterprise server 104 regarding the change(s) in directory structure 300. Rather, notification may be sent to the user of the change(s) or the information may be forwarded to wireless device 116 without notifying the user of the update.

As discussed herein, enterprise server 104 may include various modules for processing the information associated with the change(s). Enterprise server 104 can include a module backplane for connecting to the various modules.

Figure 8:
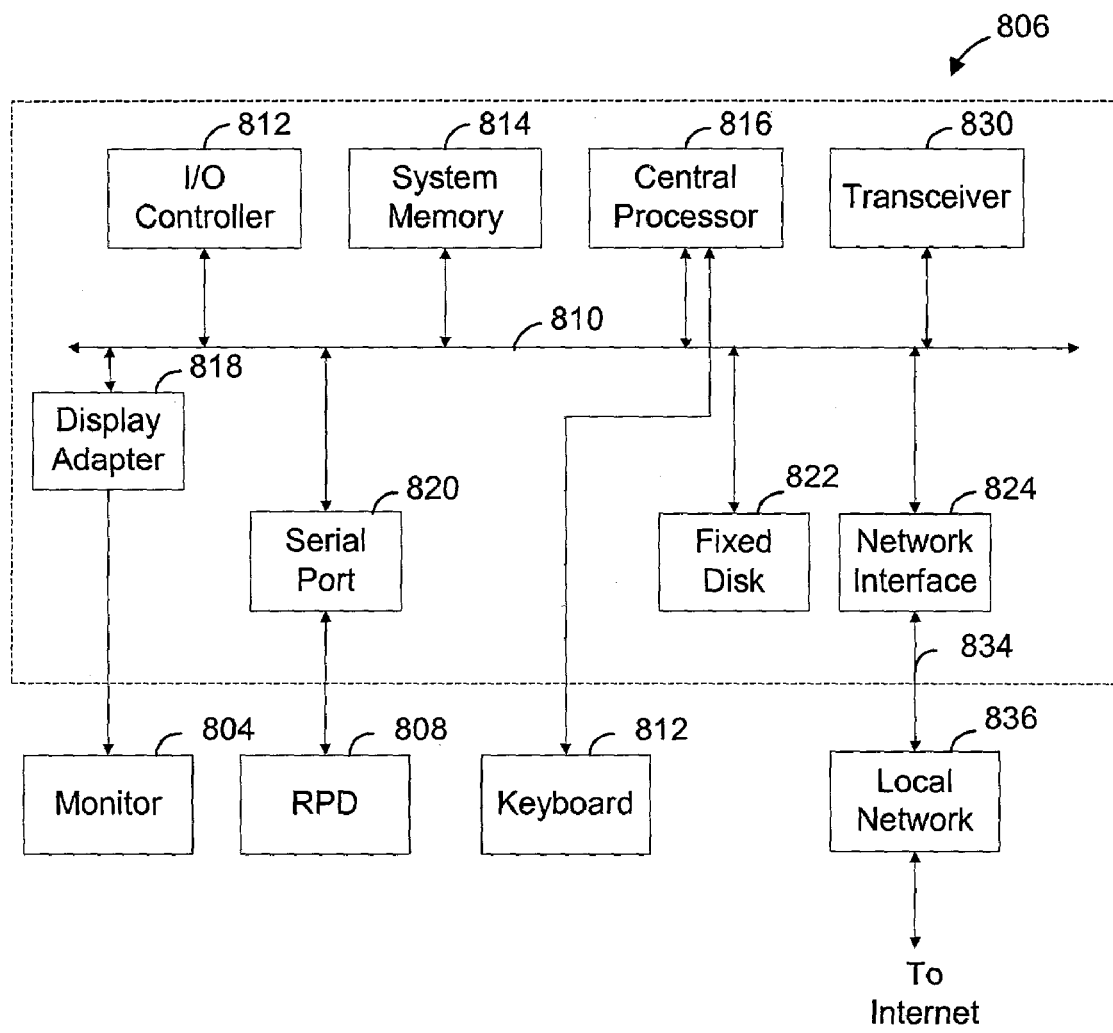
FIG. 8 illustrates subsystems of an exemplary computer system for use with the present invention.

FIG. 8 illustrates subsystems found in one exemplary computer system, such as computer system 806, that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 806 are directly interfaced to an internal bus 810. The subsystems include an input/output (I/O) controller 812, a system random access memory (RAM) 814, a central processing unit (CPU) 816, a display adapter 818, a serial port 820, a fixed disk 822 and a network interface adapter 824. The use of bus 810 allows each of the subsystems to transfer data among the subsystems and, most importantly, with CPU 816 subsystem. External devices can communicate with CPU 816 or other subsystems via bus 810 by interfacing with a subsystem on bus 810.

FIG. 8 is merely illustrative of one suitable configuration for providing a system in accordance with the present invention. Subsystems, components or devices other than those shown in FIG. 8 can be added without deviating from the scope of the invention. A suitable computer system can also be achieved without using all of the subsystems shown in FIG. 8. Other subsystems such as a CD-ROM drive, graphics accelerator, etc., can be included in the configuration without affecting the performance of computer system 806.

One embodiment according to the present invention is related to the use of an apparatus, such as computer system 806, for implementing a system according to embodiments of the present invention. CPU 816 can execute one or more sequences of one or more instructions contained in system RAM 814. Such instructions may be read into system RAM 814 from a computer-readable medium, such as fixed disk 822. Execution of the sequences of instructions contained in system RAM 814 causes the processor to perform process steps, such as the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to CPU 816 for execution. Such media can take many forms, including, but not limited to, non-volatile media, volatile media and transmission media. Non-volatile media include, for example, optical or magnetic disks, such as fixed disk 822. Volatile media include dynamic memory, such as system RAM 814. Transmission media include coaxial cables, copper wire and fiber optics, among others, including the wires that comprise one embodiment of bus 810. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media maybe involved in carrying one or more sequences of one or more instructions to CPU 816 for execution. Bus 810 carries the data to system RAM 814, from which CPU 816 retrieves and executes the instructions. The instructions received by system RAM 814 can optionally be stored on fixed disk 822 either before or after execution by CPU 816.

Many subsystem configurations are possible. FIG. 8 is illustrative of but one suitable configuration. Subsystems, components or devices other than those shown in FIG. 8 can be added. A suitable computer system can be achieved without using all of the subsystems shown in FIG. 8.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system comprising:
a file system including a directory structure having one or more folders each associated with a set of two or more wireless devices with one or more files associated with each of the set of wireless devices;
an enterprise server to monitor the directory structure for changes to the one or more files;
an interface module to maintain a logical mapping between the folders and the set of wireless devices associated with each folder and to determine the type of changes made to the files by accessing a database at the enterprise server;
a document management module (DMM) to update the database by incorporating the changes to the files; and
a push management module (PMM) to wirelessly transmit updated information for the files to the associated wireless devices indicated by the mapping.

2. The system of claim 1, further comprising an access control module (ACM) to control access to applications and documents by the device.

3. The system of claim 1, wherein the changes include at least one of addition of a file to the set of files, deletion of a file from the set of files, and renaming of a file within the set of files.

4. The system of claim 1, wherein the PMM forwards a notification to the device of the changes with the changes.

5. The system of claim 1, wherein the enterprise server comprises a multiplexer module.

6. The system of claim 1, wherein the DMM assigns a unique identifier to the information associated with the changes.

7. The system of claim 1, wherein the interface module is configured to manipulate the information associated with the changes.

8. The system of claim 1, wherein the set of files includes at least one of a file system and a directory structure.

9. The system of claim 1, wherein the set of files resides on a user computer.

10. The system of claim 1, wherein the interface module is configured to determine whether the changes to the set of files is related to a predetermined group associated with the set of files.

11. The system of claim 10, wherein the PMM is configured to conditionally forward the information to the wireless device based on the predetermined group.

12. A system comprising:
a user computer to create a file system including a directory structure having one or more folders each associated with a set of two or more wireless devices with one or more files associated with each of the set of wireless devices;
an enterprise server having a database;
an interface module to maintain a logical mapping between the folders and the set of wireless devices associated with each folder and to determine the type of changes made to the files by accessing a database at the enterprise server;
a document management module (DMM) to update the enterprise database by incorporating the changes to the files; and
a push management module (PMM) to wirelessly transmit updated information for the files to the associated wireless devices indicated by the mapping.

13. The system of claim 12, wherein the enterprise server comprises a multiplexer module.

14. The system of claim 12, wherein the changes include at least one of addition of a file to the set of files and deletion of a file from the set of files.

15. The system of claim 12, wherein the enterprise server is configured to access the set of files in order to determine whether changes to the set of files has occurred.

16. The system of claim 12, wherein the DMM assigns a unique identifier to the information associated with the changes.

17. The system of claim 12, wherein the interface module includes one or more modules configured to manipulate information associated with the changes.

18. A method comprising:
associating a folder with a set of two or more wireless devices;
receiving updates of files associated with the folder;
determining types of changes made to the files by accessing a database;
updating the database by incorporating the changes to the files; and
wirelessly transmitting updated information for the files to the associated wireless devices indicated by a logical mapping between the folder and a set of associated wireless devices.

19. The method of claim 18, further comprising determining whether at least one of a file has been added to the set of files and a file has been removed from the set of files.

20. The method of claim 18, further comprising determining whether the one or more files in the set of files have been modified.

21. The method of claim 18, further comprising forwarding a notification to the device of the changes, wherein the device is wireless.

22. The method of claim 18, further comprising accessing the set of files in order to determine whether changes to the set of files has occurred.

23. The method of claim 18, further comprising assigning a unique identifier to information associated with the changes.

24. The method of claim 23, further comprising manipulating the information associated with the changes.

25. The method of claim 18, wherein the set of files includes at least one of a file system and a directory.

26. The method of claim 18, wherein the set of files resides on a user computer.

27. The method of claim 18, further comprising determining whether the changes in the set of files is associated with a predetermined group associated with the set of files.

28. The method of claim 27, further comprising conditionally forwarding information to the device based on the predetermined group.

* * * * *